United States Patent
Manav et al.

(10) Patent No.: US 9,207,740 B2
(45) Date of Patent: Dec. 8, 2015

(54) NETWORK INTERFACE WITH LOW POWER DATA TRANSFER AND METHODS FOR USE THEREWITH

(71) Applicant: BROADCOM CORPORATION, Irvine, CA (US)

(72) Inventors: Manav, Longmont, CO (US); James Graba, Longmont, CO (US)

(73) Assignee: BROADCOM CORPORATION, Irvine, CA (US)

(*) Notice: Subject to any disclaimer, the term of this patent is extended or adjusted under 35 U.S.C. 154(b) by 335 days.

(21) Appl. No.: 13/776,073

(22) Filed: Feb. 25, 2013

(65) Prior Publication Data

US 2014/0229751 A1 Aug. 14, 2014

Related U.S. Application Data

(60) Provisional application No. 61/763,783, filed on Feb. 12, 2013.

(51) Int. Cl.
*G06F 1/32* (2006.01)

(52) U.S. Cl.
CPC ............ *G06F 1/3209* (2013.01); *G06F 1/3278* (2013.01); *Y02B 60/44* (2013.01)

(58) Field of Classification Search
CPC ....... G06F 1/32; G06F 1/3209; G06F 1/3278; Y02B 60/44; Y02B 60/40; Y02B 60/43
See application file for complete search history.

(56) References Cited

U.S. PATENT DOCUMENTS

| | | | |
|---|---|---|---|
| 2010/0046543 A1* | 2/2010 | Parnaby | 370/465 |
| 2010/0262844 A1* | 10/2010 | Diab et al. | 713/300 |
| 2010/0329108 A1* | 12/2010 | Diab et al. | 370/216 |
| 2012/0188885 A1* | 7/2012 | Tazebay et al. | 370/252 |

* cited by examiner

*Primary Examiner* — Fahmida Rahman
(74) *Attorney, Agent, or Firm* — Garlick & Markison; Bruce E. Struckman

(57) ABSTRACT

A network interface includes a physical layer device coupled to a network link. A media access control module communicates with a link partner over the network link. An energy controller monitors a link utilization level of the network link and transitions, in response to the monitoring, the media access control module and the physical layer device to a low power idle mode, wherein the low power idle mode includes periodic transmission of a plurality of refresh frames in a refresh cycle and wherein at least one of the plurality of refresh frames is modified to include at least one first data payload.

20 Claims, 3 Drawing Sheets

NETWORK INTERFACE WITH LOW POWER DATA TRANSFER AND METHODS FOR USE THEREWITH

CROSS REFERENCE TO RELATED PATENTS

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:
1. U.S. Provisional Application No. 61/763,783, entitled, NETWORK INTERFACE WITH LOW POWER DATA TRANSFER AND METHODS FOR USE THEREWITH, filed on Feb. 12, 2013.

STATEMENT REGARDING FEDERALLY SPONSORED RESEARCH OR DEVELOPMENT

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to network interfaces such as an Ethernet interface devices.

2. Description of Related Art

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (i.e., PCs, displays, printers, servers, network equipment, etc.).

In designing an energy efficient solution, one of the considerations is the utilization of the network link. For example, many network links are typically in an idle state between sporadic bursts of data. The transmission of idle signals on a link wastes energy and adds to the radiated emission levels. Identification of these frequent low link utilization periods can therefore provide opportunities to produce energy savings.

The IEEE standard 802.3az (10GBASE-T) provides a low power idle (LPI) mode of operation. An energy efficiency control policy in a network device is operative to analyze the link utilization to determine whether to enter the LPI mode to save power. In this mode of operation, refresh signals are transmitted periodically in order to maintain the link and facilitate the resumption of the link at high speeds when data transfer recommences.

The disadvantages of conventional approaches will be evident to one skilled in the art when presented the disclosure that follows.

BRIEF DESCRIPTION OF THE SEVERAL VIEWS OF THE DRAWING(S)

DETAILED DESCRIPTION OF THE INVENTION

Figure 1:
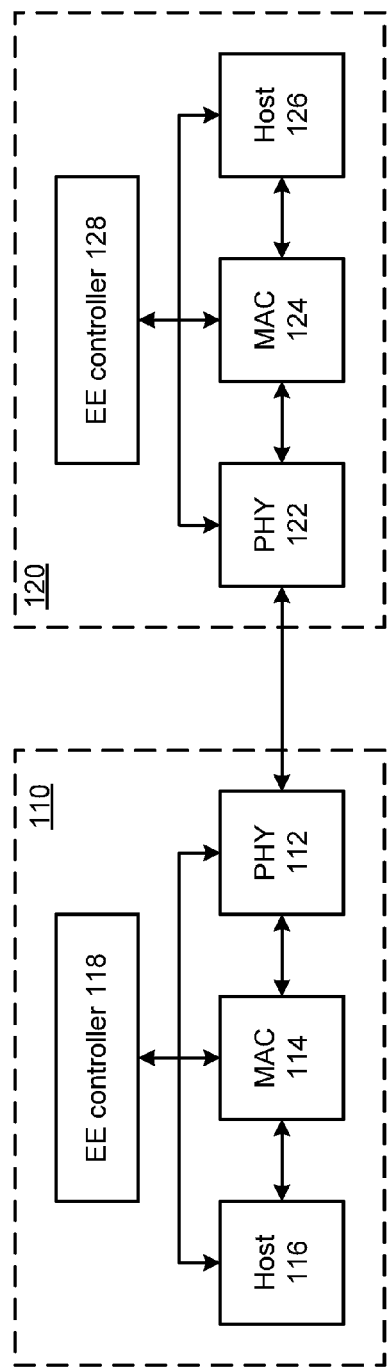
FIG. 1 is a schematic block diagram of an embodiment of two devices connected via a network link in accordance with the present invention.

FIG. 1 is a schematic block diagram of an embodiment of two devices connected via a network link in accordance with the present invention. In particular, a network link is shown to which an energy efficiency control policy can be applied. As illustrated, the link supports communication between a first link partner 110 and a second link partner 120. In various embodiments, link partners 110 and 120 can each represent a network device such as a switch, router, endpoint (e.g., server, client device, VoIP phone, wireless access point, router, etc.), or other network device. As illustrated, link partner 110 includes physical layer device (PHY) 112, media access control module (MAC) 114, and host 116, while link partner 120 includes PHY 122, MAC 124, and host 126.

In general, hosts 116 and 126 may comprise a processing unit or other suitable logic, circuitry, and/or code that may enable operability and/or functionality of the five highest functional layers for data packets that are to be transmitted over the link. Since each layer in the OSI model provides a service to the immediately higher interfacing layer, MAC modules 114 and 124 may provide the necessary services to hosts 116 and 126 to ensure that packets are suitably formatted and communicated to PHYs 112 and 122, respectively. MAC modules 114 and 124 may comprise a processing unit or other suitable logic, circuitry, and/or code that may enable handling of data link layer (Layer 2) operability and/or functionality.

MAC modules 114 and 124 can be configured to implement Ethernet protocols, such as those based on the IEEE 802.3 standard, for example. PHYs 112 and 122 can also be configured to handle physical layer requirements of the IEEE 802.3 standard. In this implementation, the network link can include four twisted pairs of copper wires such as a category five (CAT 5) cable that provides four separate data channels. PHYs 112 and 122 can each include transceivers that which provide packetization, data transfer and serialization/deserialization (SERDES). As understood by one skilled in the art, the PHYs 112 and 122 each include a processing unit or other suitable logic, circuitry, and/or code that implement physical coding sublayer components such as a linear feedback shift register, data scrambler, convolutional coder and symbol mapper. The PHYs 112 and 122 further include a processing unit or other suitable logic, circuitry, and/or code that implement physical medium attachment blocks such as a feed forward equalizer (FFE), echo and crosstalk canceller, automatic gain controller, baseline wander correction module and one or more slicers that produce an error output that is fed back to the other physical medium attachment blocks. Considering an example where the link partners 110 and 120 communicate in accordance with a 10GBASE-T standard, the communication between the MACs 114 and 124 and their corresponding PHYs 112 and 122 can be in accordance with the 10 Gigabit Media Independent Interface (XGMII).

As FIG. 1 further illustrates, link partners 110 and 120 also include energy efficiency controllers 118 and 128, respectively that are implemented via a processing unit or other suitable logic, circuitry, and/or code. In general, energy efficiency controllers 118 and 128 determine when to enter an energy saving state, what energy saving state (i.e., level of energy savings) to enter, how long to remain in that energy saving state, what energy saving state to transition to out of the previous energy saving state, etc.

In general, energy efficiency controllers 118 and 128 establish and/or implement an energy efficiency control policy for the network devices 110 and 120. In various embodiments, energy efficiency controllers 118 and 128 can be a logical and/or functional block which may, for example, be implemented in one or more layers, including portions of the PHY or enhanced PHY, MAC, switch, controller, or other subsystems in the host, thereby enabling energy-efficiency control at one or more layers.

It is a feature of the present invention that energy efficient Ethernet, such as that defined by IEEE 802.3az, can provide substantial energy savings through the use of a low power idle (LPI) mode or similar mode of operation. Prior to describing specific low power features of the link partners 110 and 120, a description of a general low power idle mode is first provided. In accordance with this example, in a normal mode of operation where the link is active, the PHYs 112 and 122 transfer data on four channels via double square 128 (DSQ128) data constellations. The energy efficiency controllers 118 and 128 monitor the link utilization level of the network link. The energy efficiency controllers 118 and 128, in response to the monitoring, transition the media access control modules 114 and 124 and the physical layer devices 112 and 122 to a low power idle mode. In particular, when the network devices 110 and 120 on both sides of the network link enter a period of silence—when there is no data to be sent—a low power idle mode can be entered by sending a SLEEP command. In this scenario, both network devices enter a low power idle mode where both transceivers are silent except for short periods of refresh signaling. While described above in terms of a symmetrical low power idle mode, an asymmetrical low power mode can be employed. In this mode of operation, one or another of the network devices 110 and 120 enters a period of silence—when there is no data to be sent to the other link partner. In this scenario, a low power idle mode can be entered by sending a SLEEP command to that enters both network devices into a low power idle mode—for data flows in one direction only. In this fashion, data flow in one direction can remain active, while the low power idle mode is implemented for flows in the other direction.

Figure 2:
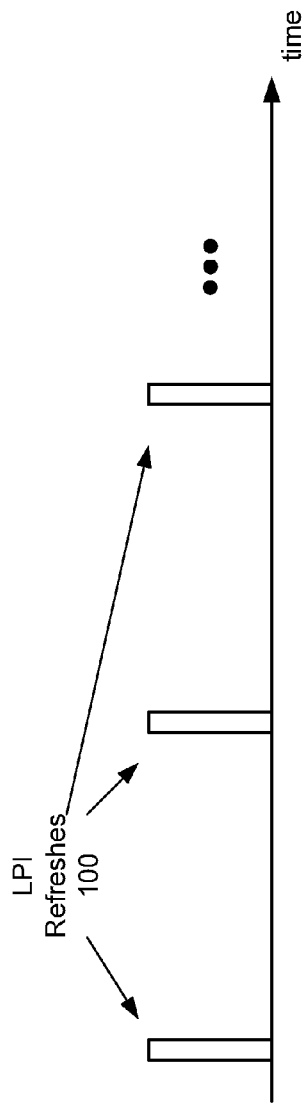
FIG. 2 is a temporal block diagram of an embodiment of low power idle refreshes in accordance with the present invention.

FIG. 2 is a temporal block diagram of an embodiment of low power idle refreshes in accordance with the present invention. In particular, FIG. 2 illustrates the transmission of refresh signaling for one channel communicated between network partners 110 and 120. The use of a low power idle mode is in contrast with the conventional transmission of idle signals when there is no data to be sent. As would be appreciated, the transmission of conventional idle signals would consume just as much power as the transmission of data. In this configuration, long periods of true idle are broken by the transmission of LPI refresh 100.

In LPI refresh in accordance with the 802.3az standard, the LPI refresh 100 consists of four frames (256 bits each) of a pseudorandom sequence that is predetermined and sent between link partners via pulse amplitude modulation (PAM2) signaling, such as Tomlinson Harashima Precoding PAM2, or other signaling. While not specifically shown, transmit and receive refreshes and refreshes on the four data channels can be staggered to mitigate the need for echo and crosstalk correction.

The refresh frames allow the PHYs 112 and 122 to maintain link quality during idle periods in preparation for recommencement of the link when standard data transfer resumes. In standard data transfer, the slicer is in an "unknown-data" mode. Noisy data samples are sliced and the nearest codeword to the received noisy sample is found, and the difference between these two is the slicer error. The standard refresh frame can be detected using either a "known-data" slicer mode. The difference between the received noisy sample and the "known" or "expected" sample of the pseudo random sequence of the refresh data sample gives us the "slicer error" for that sample, which is used to monitor and maintain the link quality.

Figure 3:
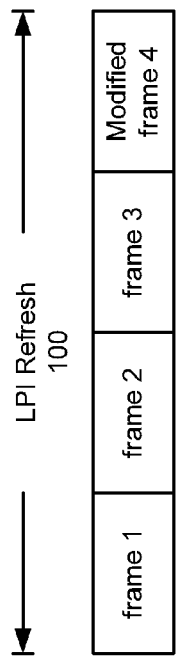
FIG. 3 is a temporal block diagram of an embodiment of a low power idle refresh 100 in accordance with the present invention.

FIG. 3 is a temporal block diagram of an embodiment of a low power idle refresh 100 in accordance with the present invention. In this example, the LPI refresh period 100 includes four refresh frames. The first three frames each include standard refresh data such as 256 bits of pseudorandom PAM2 data that are used to maintain link quality in a conventional fashion. The fourth frame is modified to include a data payload. In one embodiment, data payload symbols are overlaid on the last 128 bits of the PAM2 data of the fourth frame. In a similar fashion to an information field (IF), a data payload can be carried during this LPI mode of operation. Because the data payload is encoded over the known pseudo random sequence of the refresh data, the received noisy sample must be first "sliced" to the nearest PAM2 codeword which must then be compared with the known or expected sample to decode the "payload" information. In this way, we can use the modified refresh frame for link quality as well as for transfer of information in the data payload.

The data payload can include control data that can be used to optimize and/or maintain the link quality or to request the far transmitter to temporarily disable LPI mode in case the local receiver senses that it can better maintain the link quality when it is in non-LPI mode. For example, control data communicated between the link partners 110 and 120 can include a separate bit to force exit from TX LPI. However, the receiver cannot force exit from RX LPI without paying the penalty of a 30 ms retrain. Even with that, it is forced into LPI as soon as the retrain ends. With the proposed features, the receiver can use control data carried via LPI refresh frames to ask the remote TX to disable its LPI either indefinitely or for some predetermined time. The specific time for which this is desired can also be communicated.

In another mode of operation, when operating in normal mode, if the local side wants to communicate something to the far side, it can temporarily force LPI mode on its TX and then use the proposed features for communication via the data payload. It can also initiate a handshake mode by asking the remote side TX also to force entry into LPI mode. While there may be some packet loss, but note that, in ⅓₀th of the fast retrain time ~25K bits can be transferred.

While the data payload is described above in terms of transferring control data to maintain and monitor the health of the receiver, in addition or the alternative the data payload(s) can be used for true data transfer. In operation, the MACs 114 and 124 in conjunction with PHYs 112 and 122 use the refresh frames to communicate information.

In an embodiment, a "low power low speed" (LPLS) mode is introduced which replaces the standard 10GBASE-T LPI mode and with use of a data payload with symbols overlaid over the last 128 bits of standard refresh data. In this mode of operation, the MACs 114 and 124 can monitor required data rate to initiate or terminate LPLS mode and use the standard 10GBASE-T XGMII interface for data transfer between the MAC and PHY, and further employ the standard SLEEP, ALERT and WAKE signals. The data rate for data transfers using this new data payload approaches a 781,250 bits per second data transfer rate, depending on the amount of cyclic redundancy check (CRC) and header bits used. Employing all 4 channels and modifying four existing refresh frames enables a 25 MPBS data rate at approximately the same power and exactly the same "wake-up to full 10 GBPS" latency as the LPI mode. Entry into this LPLS mode can be designated by a customized character in place of an LPI control character.

It should further be noted that while four refresh frames are shown, additional refresh frames can be included—such as additional refresh frames modified to include additional data of the data payload. For example, the standard 4 refresh frames can be used to maintain receiver quality and the rest of the frames can be modified frames that contain a dedicated data payload. This case will have slightly higher power consumption than the standard LPI since the clocks in the DSP will have to be enabled for more time.

Figure 4:
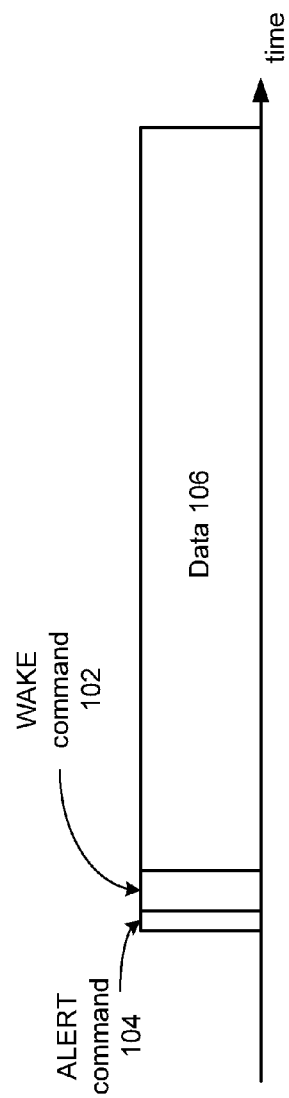
FIG. 4 is a temporal block diagram of an embodiment of alert and wake commands in accordance with the present invention.

FIG. 4 is a temporal block diagram of an embodiment of alert and wake commands in accordance with the present invention. In order to exit LPI mode, 10GBASE-T specifies usage of an ALERT command 104 with four ALERT frames followed by a WAKE command 102 with nine WAKE frames in order to give the receiver time to become fully operational to receive data 106 that follows. In yet a further mode of operation, some of these WAKE frames of a wake command 102 can be modified—replaced by a data payload. The data payload can be used to carry control data that can be used to optimize the link quality as described in conjunction with FIG. 3 or for further other purposes. Further, if the traffic pattern is such that the Energy Efficiency controllers 118 and 128 transition the link partners 110 and 120 in and out of LPI mode frequently, spending little time in LPI mode, it is possible that no refresh frames are ever transmitted. In these cases, WAKE commands 102 can be used to communicate information in a true data transfer between link partners 110 and 120.

Figure 5:
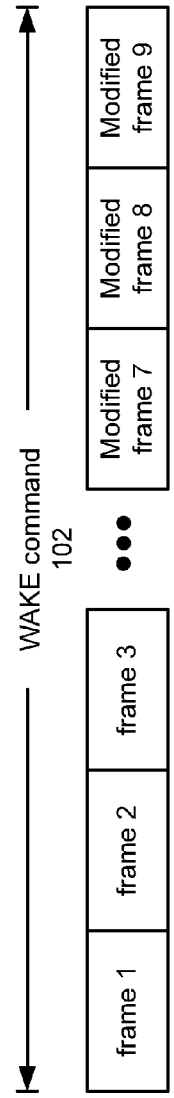
FIG. 5 is a temporal block diagram of an embodiment of a wake command in accordance with the present invention.

FIG. 5 is a temporal block diagram of an embodiment of a wake command in accordance with the present invention. In this example, the wake command 102 includes nine frames. Some frames such as frames 1, 2, 3 . . . are formatted as standard frames. Other frames such as frames 7, 8 and 9 are modified to include a data payload as described in conjunction with FIG. 4.

Replacing the last three WAKE frames with data frames, yields a data rate during these three frames that is 10 Gbit/s. In that sense, the link can be viewed as a "low latency wake-up from LPI mode", where instead of 13 frames (4 frames of ALERT and 9 frames of WAKE), the PHYs 112 and 122 woke up in just 10 frames. In another perspective, a separate "low-rate" channel is implemented with the additional payload. The channel is low-rate because information transfer is not continuous, only three frames of data payload are transferred per exit from LPI (hence, the data rate of this channel is dependent on the rate of transitions in and out of LPI). In another mode of operation, the number of WAKE frames can be increased to more than the standard 9 frames, where the additional frames can be modified frames that contain a dedicated data payload. This case will have slightly more wake-up latency than the standard LPI.

Figure 6:
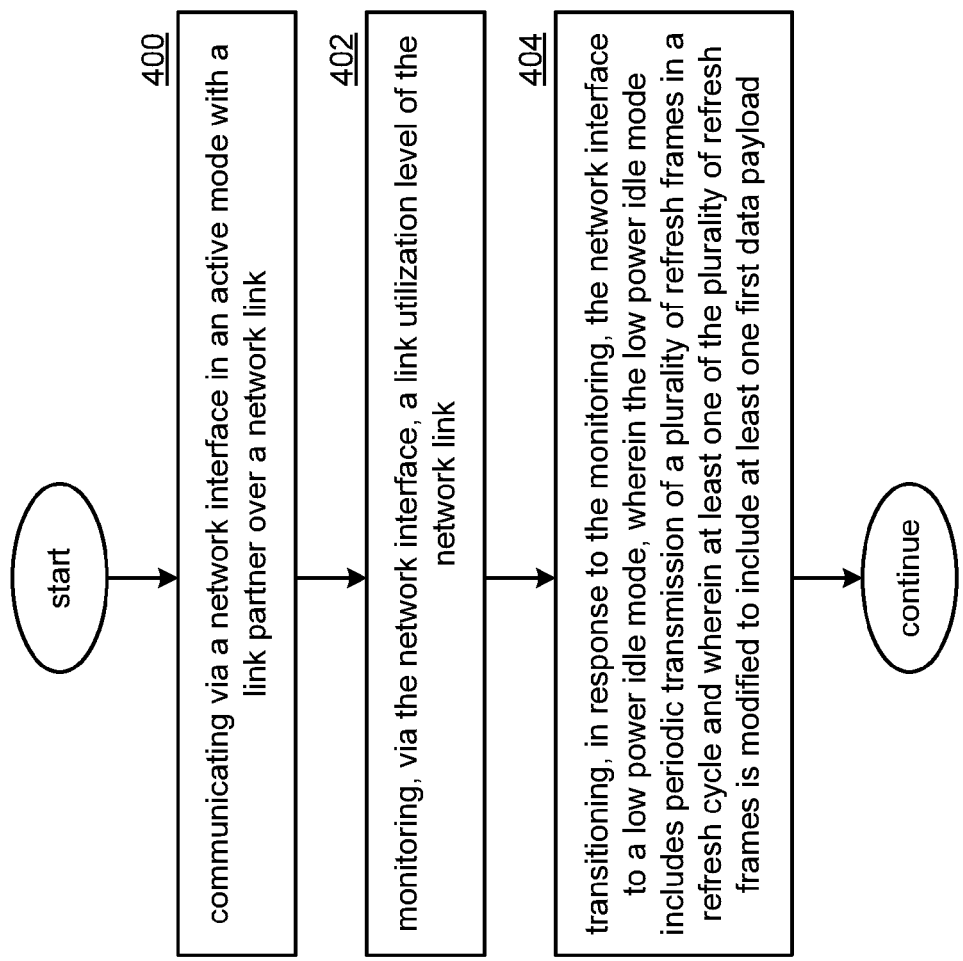
FIG. 6 is a flow diagram of an embodiment of a method in accordance with the present invention.

FIG. 6 is a flow diagram of an embodiment of a method in accordance with the present invention. In particular, a method is presented for use in conjunction with one or more functions and features described in conjunction with FIGS. 1-5. Step 400 includes communicating via a network interface in an active mode with a link partner over a network link. Step 402 includes monitoring, via the network interface, a link utilization level of the network link. Step 404 includes transitioning, in response to the monitoring, the network interface to a low power idle mode, wherein the low power idle mode includes periodic transmission of a plurality of refresh frames in a refresh cycle and wherein at least one of the plurality of refresh frames is modified to include at least one first data payload.

In an embodiment, the first data payload includes control data used by the network interface to monitor the network link and/or a request to the link partner to disable the low power idle mode. Further, the network interface can transmit a customized character that indicates establishment of a low power low speed data link via the at least one first data payload. One or more of the refresh frames of the refresh cycle can be modified to include a plurality of first data payloads. The network link can include a plurality of channels and the low power idle mode can include periodic transmission of the plurality of refresh frames in the refresh cycle of each channel. One or more of the refresh frames for each channel can be modified to include the first data payload. Further, the low power idle mode can include a wake command having wake frames. One or more of the wake frames can be modified to include at least one second data payload.

While many examples have been described in terms of Ethernet links, IEEE 802.3 standards and more specifically 802.3az and 10GBASE-T standards, the techniques described herein can be used in conjunction with other standards, and other protocols.

The foregoing examples include many advantages that will be apparent to those skilled in the art when presented this disclosure.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method, comprising:
communicating via a network interface in an active mode with a link partner over a network link;
monitoring, via the network interface, a link utilization level of the network link; and
transitioning, in response to the monitoring, the network interface to a low power idle mode, wherein the low power idle mode includes periodic transmission of a plurality of refresh frames in a refresh cycle and wherein at least one of the plurality of refresh frames is modified from a wireless standard format to include at least one first data payload by overwriting a portion of the frame with the at least one first data payload to disable the low power idle mode for a predetermined period, wherein, the low power idle mode includes a wake command, and a wake frame of the wake command is modified to include a second data payload when the refresh frame is not transmitted to the link partner.

2. The method of claim 1 wherein the at least one first data payload includes control data used by the network interface to monitor the network link.

3. The method of claim 1 wherein the at least one first data payload includes a request to the link partner to disable the low power idle mode.

4. The method of claim 1 wherein the network interface transmits a customized character that indicates establishment of a low power low speed data link via the at least one first data payload.

5. The method of claim 1 wherein at least two of the plurality of refresh frames of the refresh cycle are modified to include a plurality of first data payloads.

6. The method of claim 1 wherein the network link includes a plurality of channels, wherein the low power idle mode includes periodic transmission of the plurality of refresh frames in the refresh cycle of each channel, and wherein the at least one of the plurality of refresh frames for each channel is modified to include the at least one first data payload.

7. The method of claim 1 wherein the wake command includes a plurality of wake frames that are modified to include the second data payload.

8. An Ethernet interface comprising:
a physical layer device coupled to a network link that operates in accordance with IEEE 802.3 standard;
a media access control module, coupled to the physical layer device, for communicating with a link partner over the network link; and
an energy controller, coupled to the physical layer device and the media access control module for monitoring a link utilization level of the network link and transitioning, in response to the monitoring, the media access control module and the physical layer device to a low power idle mode, wherein the low power idle mode includes periodic transmission of a plurality of refresh frames in a refresh cycle and wherein at least one of the plurality of refresh frames is modified from a wireless standard format to include at least one first data payload by overwriting a portion of the frame with the at least one first data payload to disable the low power idle mode for a predetermined period, wherein, the low power idle mode includes a wake command, and a wake frame of the wake command is modified to include a second data payload when the refresh frame is not transmitted to the link partner.

9. The Ethernet interface of claim 8 wherein the at least one first data payload includes control data used by the Ethernet interface to monitor the network link.

10. The Ethernet interface of claim 8 wherein the at least one first data payload includes a request to the link partner to disable the low power idle mode.

11. The Ethernet interface of claim 8 wherein the physical layer device transmits a customized character that indicates establishment of a low power low speed data link via the at least one first data payload.

12. The Ethernet interface of claim 8 wherein at least two of the plurality of refresh frames of the refresh cycle are modified to include a plurality of first data payloads.

13. The Ethernet interface of claim 8 wherein the network link includes a plurality of channels, wherein the low power idle mode includes periodic transmission of the plurality of refresh frames in the refresh cycle of each channel, and wherein the at least one of the plurality of refresh frames for each channel is modified to include the at least one first data payload.

14. The Ethernet interface of claim 8 wherein the wake command includes a plurality of wake frames that are modified to include the second data payload.

15. A network interface comprising:
a physical layer device coupled to a network link;
a media access control module, coupled to the physical layer device, for communicating with a link partner over the network link; and
an energy controller, coupled to the physical layer device and the media access control module for monitoring a link utilization level of the network link and transitioning, in response to the monitoring, the media access control module and the physical layer device to a low power idle mode, wherein the low power idle mode includes periodic transmission of a plurality of refresh frames in a refresh cycle and wherein at least one of the plurality of refresh frames is modified to include at least one first data payload by overwriting a portion of the frame with the at least one first data payload to disable the low power idle mode for a predetermined period, wherein, the low power idle mode includes a wake command, and a wake frame of the wake command is modified to include a second data payload when the refresh frame is not transmitted to the link partner.

16. The network interface of claim 15 wherein the at least one first data payload includes control data used by the network interface to monitor the network link.

17. The network interface of claim 15 wherein the at least one first data payload includes a request to the link partner to disable the low power idle mode.

18. The network interface of claim 15 wherein the physical layer device transmits a customized character that indicates establishment of a low power low speed data link via the at least one first data payload.

19. The network interface of claim 15 wherein at least two of the plurality of refresh frames of the refresh cycle are modified to include a plurality of first data payloads.

20. The network interface of claim 15 wherein the network link includes a plurality of channels, wherein the low power idle mode includes periodic transmission of the plurality of refresh frames in the refresh cycle of each channel, and wherein the at least one of the plurality of refresh frames for each channel is modified to include the at least one first data payload.

* * * * *